United States Patent Office 2,861,986
Patented Nov. 25, 1958

2,861,986

PLASTIC MATERIAL PRODUCED BY THE REACTION OF CELLULOSE TRIACETATE WITH A POLYOL

Michel Antoine André Fleuret, deceased, late of Paris, France, by Anna Fleuret nee Anna Jaud, sole heir No Drawing. Application July 31, 1956
Serial No. 606,792

6 Claims. (Cl. 260—226)

The present invention has for its object the preparation of plastic material adapted for industrial purposes and adapted to be molded through injection under pressure at a raised temperature so as to form rigid and stable articles of any description such as rods and tubes. The basic material of this novel plastic material is cellulate acetate modified through condensation and coaction. The composition of such plastic materials is defined through its method of preparation, the substances reacting for its production and the physical and mechanical properties of the article obtained.

There is obtained a reaction product of acetate of cellulose and a polyhydric alcohol, provided with one or more bridge connections: the cellulosic hydroxide groups remain free or are freed through a partial deacetylating reaction and are attached through one or more ether oxide or polyol groups which latter may be partly transformed into an internal ether (epoxide) or into a polypolyol through condensation with a further molecule of polyol.

The molten and cooled material obtained through this method is characterized by its non-solubility in water, oil, alcohol, and through its physical characteristic properties such as its easy melting and casting properties, its vitreous and resinous appearance and its conchoidal surface when broken and also the possibility of molding it through injection.

After cooling, the articles obtained cannot be deformed and are provided with excellent physical and mechanical properties. It is in fact possible to spin the material without the use of a solvent. These properties of the molded article obtained are as a whole very similar with those of the polymers prepared through condensation of adipic acid with polyamides, i. e. the products sold under the registered name "nylon" with the advantage however that the cost price of the improved product on a commercial scale is lower.

The chemical structure of the high polymers according to this invention is defined by their method of production since their spatial formula is problematical and their molecular weight is considerable. Therefore, an attempt will merely be made to diagrammatize it as follows:

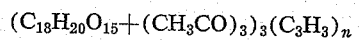

or

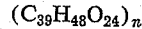

In the case of the simplest of such polymers, these products are obtained starting from cellulose acetate, prepared in accordance with conventional practice, which is then condensed at raised temperature with one or more polyols, optionally in the presence of a catalyst such as an acetate of zinc, copper, mercury or aluminium. The products thus obtained have a vitreous and resinous appearance with a conchoidal surface when broken. They are translucent, of a more or less golden color and they may in fact be dyed. When dissolved in a suitable solvent such as acetic acid or chloroform and then precipitated by a diluent adapted to be mixed in any proportion in the solvent, they form a similar precipitated product having a microcrystalline greyish appearance similar to that of broken sugar loaves, whereas it should be considered that ordinary acetate of cellulose when dissolved and precipitated under similar conditions produces long and light fibres. The improved plastic materials have a true and clearly defined melting point, the simplest of said condensates melting between 226 and 228° C. whereas the acetate becomes soft without any clean melting point between 140 and 160° C. and is carbonized above said temperatures.

There will now be described by way of example, and by no means in a limiting sense, a preferred procedure for obtaining such plastic materials:

Inside a closed vessel, constituted by a vat adapted to be heated and which may form a digester, 10 kilograms of triacetate of cellulose is condensed with 50 kilograms of 1,2,3 propane-triol.

The temperature is raised to about 230 to 240° C. and the mixture is kept at said temperature during at least one hour in the presence of a catalyst constituted by 100 grams of copper acetate.

The casting is performed after about one hour; the plastic material obtained is washed and dried. About 12,500 kilograms to 13 kilograms of a product melting at 226 to 228° C., which forms a yield of 125 to 130% of the weight of acetate is obtained. There remains an excess of polyol. This example is obviously not limiting and many other polyols or mixtures thereof may be used and more particularly pentaerythritol.

According to a modification, a harder homogeneous plastic material is prepared by condensing in situ, inside the mass undergoing the heating treatment and after the first stage thereof, the polyol, which has been incorporated and bound with the cellulose acetate, with a monoacid or a polyacid. After the first baking as defined hereinabove the material is cast and the mass is set, separated from the excess of polyol and still containing an excess with reference to stoichiometric amounts, inside a further reacting vessel without any cooling and there is incorporated into said mass measured amounts of a monoacid or a diacid such for instance as maleic acid, succinic acid, adipic acid, orthophthalic anhydride or terephthalic acid with or without a further catalyst: the excess of polyol or the free hydroxyl groups of the combined polyol condense with the acid thus incorporated so as to form an ester which connects the molecules of the first condensate through further links and to this end the mass is heated during a more or less protracted period while stirring the molten mass. Thus a compound plastic material is obtained constituted by an aceto-cellulosic polyolic poly-esterified product. This condensate is more brilliant and harder and more readily breakable than that described in the first example.

Lastly, it is also possible to use no longer fresh cellulose acetate but cellulose acetate recovered from industrial by-products such as waste material constituted by kinematographic film waste having acetate of cellulose as a base or old acetate cellulose kinematographic films freed of their sensitive gelatine surface through any known means and treated in the same manner as the specially prepared cellulose acetate referred to hereinabove. Thus a plastic material is obtained having the same properties as those disclosed precedingly except for the fact that it is often of a warmer tint by reason probably of the presence of the plasticizer remaining in the film waste, which plasticizer cannot be completely removed. It should be remarked that for certain articles a suitable plasticizer may be incorporated purposely into the mixture.

What is claimed is:
1. A process for the preparation of a plastic product which comprises the steps of heating at a temperature of 230°–240° C. a mixture of cellulose triacetate with a polyol selected from the group consisting of propane triol and pentaerythritol, with said polyol in excess of the stoichiometric quantity, to produce a reaction mixture containing said product in the presence of the excess polyol, and washing said mixture to separate the excess polyol from the plastic product.

2. A process for the preparation of a plastic product which comprises the steps of heating at a temperature of 230°–240° C. a mixture of cellulose triacetate with a polyol selected from the group consisting of propane triol and pentaerythritol, with said polyol in excess of the stoichiometric quantity, to produce a reaction mixture containing said product in the presence of the excess polyol, adding to the reaction mixture a member of the group consisting of maleic acid, succinic acid, adipic acid, orthophthalic anhydride, and terephthalic acid, and heating the resulting mixture.

3. A process for the preparation of a plastic product which comprises the steps of heating at a temperature of 230°–240° C. a mixture of cellulose triacetate film in particulate form with a polyol selected from the group consisting of propane triol and pentaerythritol, with said polyol in excess of the stoichiometric quantity, to produce a reaction mixture containing said product in the presence of the excess polyol, and washing said mixture to separate the excess polyol from the plastic product.

4. The plastic product produced by the steps of heating at a temperature of 230°–240° C. a mixture of cellulose triacetate with a polyol selected from the group consisting of propane triol and pentaerythritol, with said polyol in excess of the stoichiometric quantity, to produce a reaction mixture containing said product in the presence of the excess polyol, and washing said mixture to separate the excess polyol from the plastic product.

5. The plastic product produced by the steps of heating at a temperature of 230°–240° C. a mixture of cellulose triacetate with a polyol selected from the group consisting of propane triol and pentaerythritol, with said polyol in excess of the stoichiometric quantity, to produce a reaction mixture containing said product in the presence of the excess polyol, adding to the reaction mixture a member of the group consisting of maleic acid, succinic acid, adipic acid, orthophthalic anhydride, and terephthalic acid, and heating the resulting mixture.

6. The plastic product produced by the steps of heating at a temperature of 230°–240° C. a mixture of cellulose triacetate film in particulate form with a polyol selected from the group consisting of propane triol and pentaerythritol, with said polyol in excess of the stoichiometric quantity, to produce a reaction mixture containing said product in the presence of the excess polyol, and washing said mixture to separate the excess polyol from the plastic product.

References Cited in the file of this patent

UNITED STATES PATENTS

| | | |
|---|---|---|
| 1,317,276 | Dupont | Sept. 30, 1919 |
| 1,394,752 | Miles | Oct. 25, 1921 |
| 2,106,296 | Drefus et al. | Jan. 25, 1938 |